United States Patent Office 2,916,094
Patented Dec. 8, 1959

2,916,094

PROPELLER CONTROL SYSTEM

Kenneth L. Berninger and Robert K. Skinner, Dayton, and Calvin C. Covert, Vandalia, Ohio, assignors to General Motors Corporation, Detroit, Mich., a corporation of Delaware Application December 11, 1956, Serial No. 627,630

5 Claims. (Cl. 170—160.21)

This invention pertains to variiable pitch propellers, and more particularly to an improved control system for a turbine driven variable pitch propeller.

Heretofore, variable pitch propeller control systems have been designed including fluid-motor means for varying propeller pitch, the motor-means being controlled by a continuously pulsating solenoid valve. In prior control systems, the pulse ratio of the solenoid valve was controlled by an electronic governor having speed and acceleration sensitivity. The present invention relates to a propeller control system wherein the solenoid valve is only energized by an electronic acceleration responsive circuit during changes in propeller speed. The speed control is effected by a centrifugally responsive governor valve. The propeller control system of this invention is designed for use with a propeller of the type disclosed in copending application Serial Number 272,398, Treseder et al., filed February 19, 1952, now Patent No. 2,804,154 and assigned to the assignee of this invention. Accordingly, among our objects are the provision of a propeller control system including independent speed and acceleration means for varying propeller pitch; the further provision of a variable pitch propeller control system including a centrifugally responsive governor valve; the further provision of a propeller control system including a governor valve with fluid motor-means for actuating the governor valve to effect feathering or reverse pitch operation thereof; and the still further provision of an electronic acceleration sensitive circuit for a variable pitch propeller.

The aforementioned other objects are accomplished in the present invention by connecting a solenoid actuated valve and a centrifugally responsive governor valve in parallel between a source of fluid under pressure and pitch changing means. Specifically the propeller is of the type including an independent fluid motor for rotating each blade about its longitudinal axis to vary the pitch position thereof. The pitch positions of the several propeller blades are coordinated by a master gear in the hub. The hydraulic control system is disposed within a regulator rotatable with the propeller hub and includes a plurality of pumps energized incident propeller rotation for supplying fluid under pressure. The output pressure of the pumps is regulated by a pressure control valve and thereafter conducted to the pressure supply ports of the solenoid valve and the centrifugal governor valve. An electric motor driven pump is incorporated in the regulator to supply pressure fluid for adjusting propeller pitch when the propeller is not rotating, or is rotating at a speed insuffiient to produce adequate pressure by the propeller driven pumps.

The solenoid valve and the centrifugal governor valve have an increase and decrease pitch control ports connected with opposite sides of the pitch adjusting fluid motors. The solenoid valve may be of the type disclosed in Patent Number 2,630,136, Brandes et al. and includes a reciprocal spool valve for connecting the control ports to either drain or pressure, movement of the valve being controlled by energization of solenoid coils. The centrifugal governor valve includes a casing having a reciprocal plunger therein. The plunger is urged in one direction by the thrust of centrifugal force and one end thereof is connected to a lever which is spring biased in the opposite direction about a fulcrum point. When the thrust of centrifugal force acting on the valve plunger and lever is in equilibrium with the opposing spring force, both control ports will be closed by the plunger. At this time the propeller is rotating at the selected speed setting of the governor valve. The lever is formed with a cam surface that cooperates with a roller attached to one end of a link, the link being pivoted intermediate its ends to the rod of a reciprocal low pitch stop piston. The other end of the link is pivotally connected to reciprocal feed-back rod which is positioned by the master gear.

The low pitch stop piston is disposed within a cylinder having a bore with different diameter portions. A feather piston is disposed within the enlarged diameter portion and is slideably mounted on the rod of the low pitch stop piston. The cylinder chambers to which the low pitch stop piston is exposed are connected by conduits to a low pitch stop control valve, and the feather piston chamber is connected by conduit to a feathering control valve. The low pitch stop piston is normally biased by fluid under pressure into engagement with the feather piston. When the feathering control valve is actuated the feather piston chamber is connected to drain the low pitch stop piston will position the centrifugal governor valve plunger so as to effect an increase in propeller pitch until the propeller reaches the feathered position. When the low pitch stop valve is actuated, a low pitch stop piston will position the centrifugal governor valve plunger so as to effect decrease in propeller pitch until the propeller reaches the full reverse position. In the normal condition the low pitch stop piston positions the link so that the feed-back will interrupt the supply of fluid under pressure to the pitch changing motors at the predetermined low positive angle, for instance positive 10°.

The solenoid valve is controlled by an electronic acceleration sensitive circuit. This circuit includes means for differentiating an electric signal proportional to propeller speed to produce a voltage proportional to propeller acceleration or deceleration. When the propeller is on speed, no acceleration voltage is produced and hence the solenoid valve remains in its neutral position. During the propeller acceleration, an output signal is produced which energizes the increased pitch side of the solenoid valve so as to apply pressure fluid to increase propeller pitch. During propeller deceleration, an output signal is produced which energizes the decreased pitch side of the solenoid valve so as to apply pressure fluid to decrease propeller pitch. The solenoid valve and the centrifugal governor valve thus conjointly control the propeller pitch when the propeller is off speed. However, the solenoid valve is only operative when the propeller is in the governing range, since during feathering and reverse pitch operations the centrifugal governor valve controls pitch by itself and the solenoid valve is disconnected. During propeller operation in the governing range, the hydraulic low pitch stop is operable since the governor valve has sufficient full capacity to override any pressure fluid which is supplied by the solenoid valve.

Further objects and advantages of this invention will be apparent from the following description, reference being had to the accompanying drawings, wherein a preferred form of the present invention is clearly shown.

Figure 1:
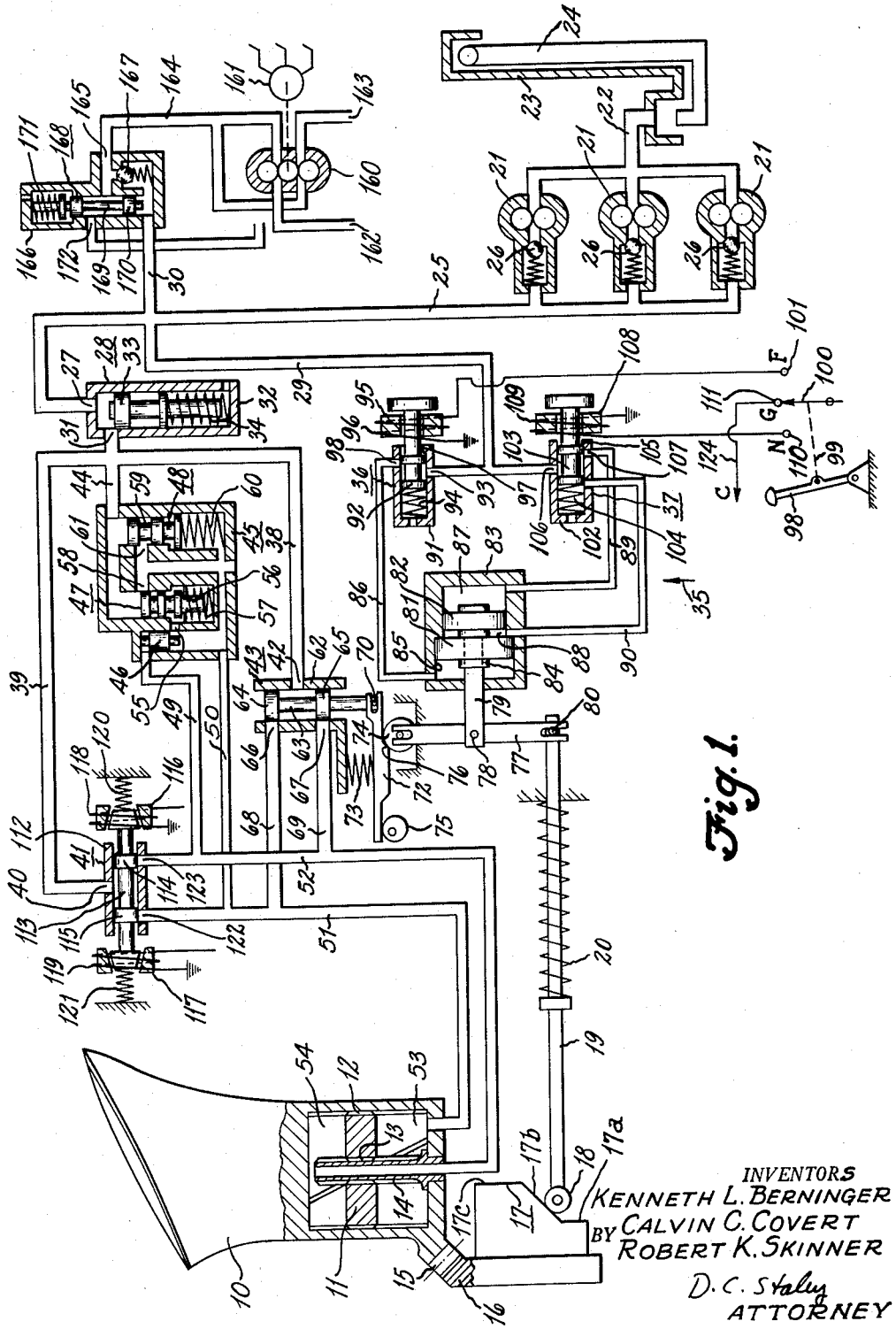
Figure 1 is a schematic diagram of the hydraulic control system of this invention.

With particular reference to Figure 1, the propeller is of the type referred to in copending application Serial Number 272,398, and thus includes a hub having a plurality of radially extending propeller blades journaled therein for their rotation about their longitudinal axes. The hydraulic control system is disposed within a regulator attached to and rotatable with the propeller hub. As seen schematically in Figure 1 the propeller includes a blade 10 having a hollow root portion within which a torque unit, or fluid motor-means, is mounted. The motor-means includes a piston 11 having external helical splines 12 and internal splines 13, the external helical splines mating with helical splines formed on a cylinder, which as depicted in Figure 1 is integral with the blade 10. The internal helical splines 13 of the piston 11 mate with a fixed reaction member 14 having external helical splines. Reaction member 14 is attached to a hub boss. As alluded to hereinbefore the blade 10 is journaled for rotation in the hub not shown, for rotation about its longitudinal axis. The blade is formed with an integral, bevel-type sector gear 15 which meshes with a master gear 16 journaled for rotation about the horizontal propeller axis. A master gear 16 coordinates and synchronizes the pitch adjusting movements of all the propeller blades in the hub.

The master gear 16 is formed with a cam surface 17 which is engaged by a follower-type roller 18 carried by a reciprocal rod 19. The rod 19 is engaged by a spring 20 for maintaining the roller 18 in contact with the cam surface 17.

Structurally, the rod 19, which constitutes a feedback member, is noted for axial movement relative to the propeller hub, and extends from the hub into the regulator containing the hydraulic control system. The regulator contains a plurality of pumps 21 which are energized incident to propeller rotation. The pump inlets are connected to a conduit 22 which connects with a shroud 23. A shroud 23 is disposed within the regulator as shown in the aforementioned copending application, and has disposed therein a pick-up tube 24. During propeller rotation the pumps 21 draw fluid through pick-up tube 24 from the regulator and discharge the fluid under pressure to a conduit 25. The outlet of each pump 21 includes a spring biased check valve 26 which prevents the back flow of fluid from the conduit 25. The conduit 25 communicates with an inlet port 27 of a minimum pressure valve 28. In addition, the conduit 25 connects with branch conduits 29 and 30. The function of the minimum pressure valve 28 is to prevent the connection of conduit 25 with outlet port 31 until a certain minimum pressure is attained in the line, or conduit, 25. Thus the minimum pressure valve includes a casing 32 having a plunger 33 therein. The plunger 33 is urged upwardly as viewed in Figure 1 by means of a spring 34. It is to be noted that all the components of the hydraulic control system are disposed within and rotatable with the regulator, alluded to hereinbefore. Hence, the control valves respond to the thrust of centrifugal force in the direction of arrow 35 as shown in Figure 1. The minimum pressure valve 28 assures that during operation of pumps 21 there will always be a supply of fluid under pressure available for the feathering valve 36 and the low pitch stop valve 37.

When the pressure in conduit 25 exceeds the load of spring 34 plus the thrust of centrifugal force, the plunger 33 will be moved downwardly to interconnect ports 27 and 31. At this time fluid under pressure will communicate with conduits 38 and 39. Conduit 39 is connected to the inlet port 40 of a solenoid valve 41. Conduit 38 communicates with the inlet port 42 of a centrifugally operable governor valve 43. In addition, the port 31 is connected by conduit 44 to a pressure control valve assembly 45. The pressure control valve assembly 45 includes a shuttle valve 46, an equal area valve 47 and a pressure relief valve 48.

The function of the pressure control valve is to maintain a pressure in conduits 38 and 39 equal to the requirements of the pitch changing motor means. Thus, opposite ends of the shuttle valve 46 are connected by conduits 49 and 50 to conduits 52 and 51 respectively which connect with hub passages and communicate with the torque unit of each propeller blade. As shown schematically in Figure 1, the conduit 51 communicates with the increase pitch chamber 53 of the torque unit while the conduit 52 communicates with the decrease pitch chamber 54. Whichever of conduits 51 or 52 is at the higher pressure potential, will cause the shuttle valve 46 to interconnect either conduit 49 or 50 with the passage 55. The passage 55 communicates with the underside of the equal area valve 47. The equal area valve 47 includes a plunger 56 having opposed equal areas. The plunger 56 is biased upwardly by the means of a spring 57 and is also urged upwardly by the thrust of centrifugal force. The plunger 56 is urged downwardly by the pressure of fluid from conduit 44. The plunger 47 controls a drain port 58 and thereby regulates the pressure potential of fluid in conduits 38, 39, and 44. In the disclosed embodiment the pressure potential in lines 38 and 39 is maintained equal to the sum of the higher of the pressure potentials in either lines 51 or 52 plus the equivalent pressure of spring 57 and the thrust of centrifugal force acting on the plunger 47.

The pressure relief valve 48 comprises a plunger 59 which is biased upwardly by the means of a spring 60. The function of the pressure relief valve 48 is to connect the conduit 44 to drain through port 61 when the pressure in conduit 44 exceeds a predetermined maximum for which the pressure relief valve is calibrated. Thus the pressure relief valve merely constitutes a safety device.

The centrifugal governor valve 43 includes a casing 62 having the plunger 63 disposed therein. The plunger 63 is mounted for reciprocal movement and includes a pair of space lands 64 and 65 which cooperate with a pair of space control ports 66 and 67 respectively. The control port 66 is connected by a branch conduit 68 with the increase pitch conduit 51. The control port 67 is connected by branch conduit 69 with the decrease pitch conduit 52. The plunger 63 is pivotally connected at 70 to one end of a lever 72. The lever 72 is engaged by a spring 73 and has an intermediate roller 74. The opposite end of the lever 72 engages a fulcrum 75 which is rotated during propeller rotation thereby jittering the lever 72 and the plunger 63 to eliminate static friction. The spring 73 opposes the thrust of centrifugal force acting on the lever 72 and the plunger 63. During normal power of operation the lever 72 does not engage the roller 74, and thus the speed setting of the governor valve is determined by equilibrium of the opposite acting forces, namely centrifugal force acting on the plunger and lever in the upper direction as used in Figure 1 about the jitter eccentric 75 as opposed by the spring 73. When the propeller is rotating at the speed setting of the governor valve setting assembly the plunger 63 will be positioned so that lands 64 and 65 close the ports 66 and 67 respectively. Inasmuch as opposite ends of the casing 62 are connected to drain and the inlet port 42 communicates with the angular channel between lands 64 and 65 conduit, it will be apparent that fluid flow between the governor valve and the torque unit is blocked.

However, should the propeller speed increase above the speed setting of the governor valve, the thrust of centrifugal force will overcome the force of the spring 73 and the plunger 63 will move upwardly connecting port 66 with the high pressure through port 42 while connecting port 67 to drain. In this manner, high pressure fluid is applied from conduit 38 through port 42, port 66, conduit 68, and conduit 51 to the increase pitch chamber 53 of the torque unit while the decrease pitch chamber 54 is connected to drain through conduit 52, conduit 69, and port 67. Thus the piston 11 will be moved radially outward, and due to the helical spline connection with the torque unit cylinder, will rotate the blade 10 in an increase pitch direction. Thus the propeller will increase the load on the turbine driving the propeller so as to reduce the speed back to the normal speed setting of the governor.

Conversely, should the propeller speed decrease below the speed setting of the governor valve 43, the thrust of the spring 73 will exceed that of the centrifugal force, and accordingly the plunger will move downwardly as a unit in Figure 1. When the plunger goes downwardly the decrease pitch chamber 54 of the torque unit is connected to high pressure through conduits 52 and 69, and ports 67 and 42 while the increase pitch chamber 53 is connected to drain through conduits 51 and 68, and port 66. Thus the piston 11 will move downwardly so as to decrease propeller pitch thereby decreasing the load on the engine and permitting the engine, or turbine, to increase its speed.

The roller 74 coacts with cam surface 76 on the lever 72. The roller 74 is carried by one end of a link 77 having an intermediate pivot at 78 to a piston rod 79. The other end of the link 77 has a pivotal connection at 80 with the feed-back rod 19. The piston rod extends through a feathering piston 81 and is attached to a low pitch stop piston 82. Both the feathering piston 81 and the low pitch stop piston are disposed in a cylinder 83 having different diameter portions. The feathering piston 81 is disposed in the larger diameter cylinder bore while the low pitch stop piston 82 is disposed in the smaller diameter bore. The piston rod 79 has a collar 84 affixed thereto as shown in Figure 1. The larger diameter cylindrical bore 85 is connected by a conduit 86 to the feathering valve 36. The low pitch stop piston 82 divides the small diameter bore into chambers 87 and 88. Chamber 87 is connected by conduit 89 with the low pitch stop valve 37, and chamber 88 is connected by conduit 90 with the low pitch stop valve assembly 37.

The feathering valve assembly 36 includes a casing 91 having a plunger 92 disposed therein for reciprocal movement. The casing 91 includes a pressure supply port 93 which is connected to conduit 29. The plunger 92 is biased by means of a spring 94 to the right as shown in Figure 1. The plunger 92 includes an armature 95 about which a solenoid coil 96 is wound. The spring 94 normally positions the plunger 92 in engagement with a stop 97 so that the port 93 is interconnected with the port 98 which connects with the conduit 86. When the solenoid 96 is energized, the plunger 92 is moved to the left thereby connecting port 98 to drain. When port 98 is connected to drain the chamber 85 is connected to drain through conduit 86, and the feathering piston 81 can move to the left as shown in Figure 1. Energization of the solenoid 96 is controlled by the pilot, or more particularly by the movement of the pilot's control lever 98 which is shown schematically as connected by a linkage 99 to a switch contact 100. The switch contact 100 is connected to a source of direct current voltage, and when the lever 98 is moved to the feathering position the contact 100 engages stationary contact 101 so as to energize the solenoid 96.

The low pitch stop valve 37 includes a casing 102 having disposed therein a reciprocal plunger 103. The plunger 103 is engaged by a spring 104 which normally biases the plunger 103 into engagement with a stop 105, at which position the inlet port 106 connected to conduit 29 communicates with outlet port 107 connected with conduit 89. Thus, in the normal position of the low pitch stop plunger 103, the chamber 87 is connected to pressure. When the chamber 87 is connected to pressure, the chamber 88 is connected to drain through conduit 90 and the casing 102. In this position, the low pitch stop piston 82 is moved to engagement with the feathering piston 81. Thus, if the chamber 85 is connected to drain by energization of the feathering solenoid 96, the piston 82 will move to the left as viewed in Figure 1, thereby pivoting lever 77 about a point 80 and causing the roller 74 to engage the cam surface 76 and move the governor valve plunger 63 upwardly so as to call for an increase in propeller pitch. When the propeller pitch has been increased to the feathered position, the roller 18 will be in engagement with surface 17a of the cam 17 at which point the rod 19 will have moved to the left as viewed in Figure 1 so as to pivot the lever 77 about the point 78 so that the roller 74 no longer engages the cam surface 76. Thus, when the propeller blades reach the feathered position the application of pressure fluid to the torque unit is automatically discontinued.

The plunger 103 of the low pitch stop valve assembly extends through an armature 108 which is circumscribed by a solenoid coil 109. The solenoid coil 109 is connected to contact 110 which cooperates with the movable switch contact 100. When the pilot's control lever 98 is moved so that the contact 100 engages the contact 110 solenoid coil 109 is energized, thereby moving the plunger 103 to the left as viewed in the drawing so as to connect port 106 to pressure and port 107 to the drain thereby connecting chamber 88 to pressure and chamber 87 to drain. Thus, the low pitch stop piston 82 will move to the right as viewed in Figure 1 pivoting the lever 77 in the clockwise direction about point 80 so that the spring 73 can move the lever 72 about the eccentric fulcrum 75 thereby connecting decrease pitch chamber 54 to pressure and increase pitch chamber 53 to drain. At this time the piston 11 will move downwardly turning the blades in the decrease pitch direction until the maximum negative angle is reached at which point the roller 18 will engage the surface 17c of a cam 17 and move the rod 19 to the right as viewed in Figure 1. When the rod 19 is moved to the right it will pivot link 77 about pivot point 78 so as to move the lever 77 in a counter-clockwise direction and move the plunger 63 upwardly through the lever 72 thereby cutting off the application of pressure fluid to the decrease pitch chamber 54. Thus, when the maximum reverse, or negative, angle is reached by the blades the application of pressure fluid to the torque units is automatically discontinued.

In the normal position of the feathering valve 36 and the low pitch stop valve 37, at which position the control lever is in the governing range, and switch contact 100 engages switch contact 111, both solenoid coils 96 and 109 are deenergized. Thus, at this time the low pitch stop piston 82 is positioned as shown in Figure 1 and the low pitch stop piston rod 79 assumes the position shown. Under these conditions the cam surface 17b of the cam 17 will cooperate with the follower 18 to actuate the rod 19 at a predetermined low angle of the propeller blades, for instance the positive 10°. This angle is known as the hydraulic low pitch stop angle, and when this angle is reached by the blades, the rod 19 will move to the right, thereby pivoting lever 77 in a counterclockwise direction about point 78 so that the roller 74 will engage the cam surface 76 and move the plunger 63 upwardly. This will cut off the application of pressure fluid to the decrease pitch chamber 54 and thus establish a hydraulic low pitch stop for the propeller blades.

The solenoid valve 41 includes a casing 112 having disposed therein a reciprocal plunger 113 having a pair of space lands 114 and 115. The plunger also includes end armatures 116 and 117 which are encompassed by solenoid coils 118 and 119 respectively. The solenoid valve plunger 113 is normally biased to a center position by a pair of opposed springs 120 and 121. In a center position the lands 114 and 115 close control ports 123 and 122 respectively. Thus when solenoid coils 118 and 119 are deenergized, the solenoid valve does not apply fluid pressure to or drain fluid pressure from either of the pitch conduits 51 and 52. As alluded to hereinbefore, the energizing circuit for the solenoid valve 41 is only operable when the propeller control lever 98 is in the governing position, i.e. when the switch contact 100 engages the contact 111. Thus, when the propeller is operating either the feathering or the negative thrust regimes, the solenoid valve is inoperable. In addition, in the governing range the centrifugal governor valve 43 has sufficient capacity to override the solenoid valve 41 to effect the hydraulic low pitched stop hereinbefore mentioned.

Figure 2:
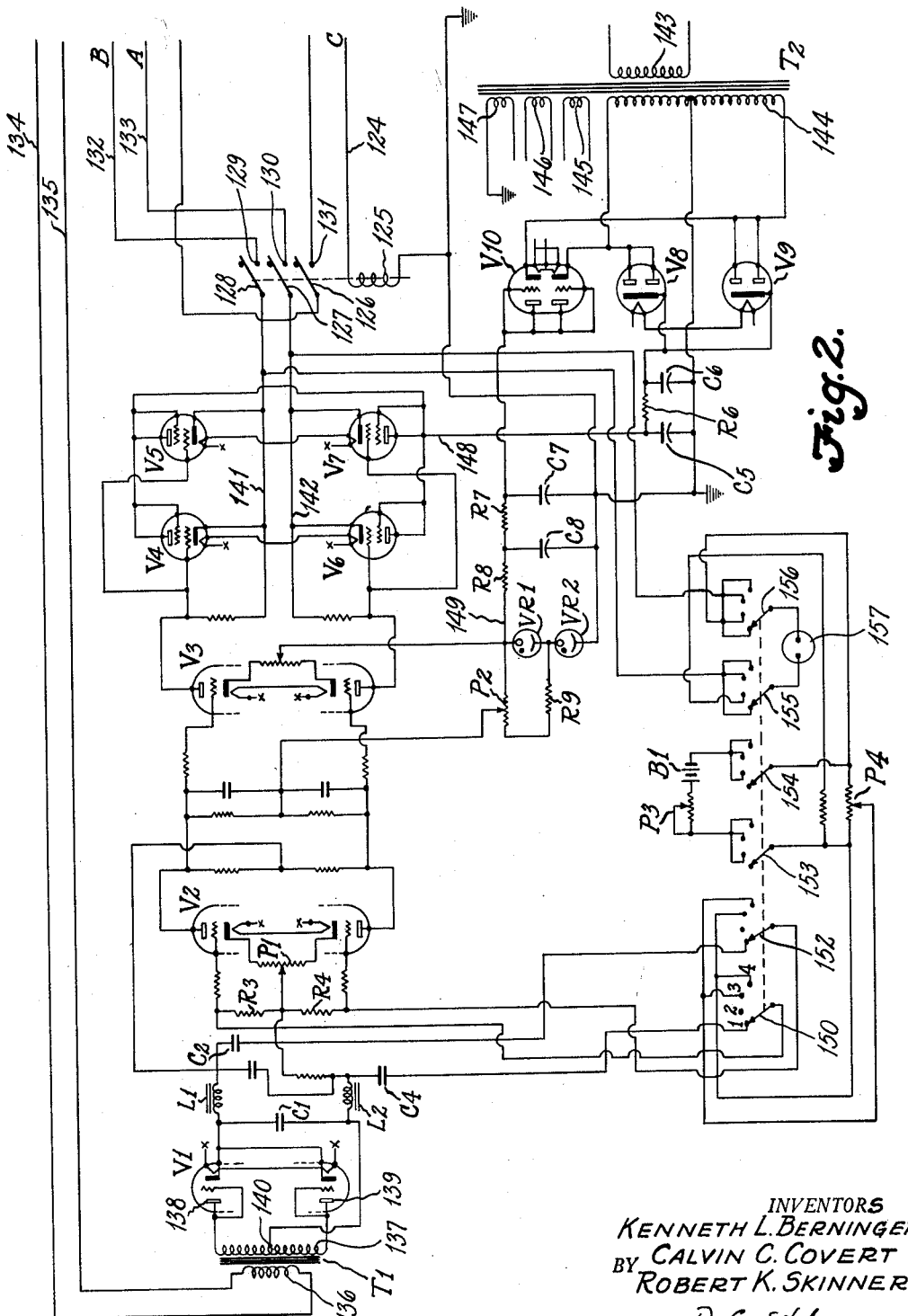
Figure 2 is a circuit diagram of the electronic acceleration sensitive unit.

With particular reference to Figures 1 and 2, the contact 111 is connected to a wire 124 having an end designated C. This wire 124 is continued on Figure 2 and connects with a relay coil 125, the opposite end of which is connected to ground. Thus, when the pilot's control lever 98 is moved to the governing position, the contact 100 engages the contact 111 and energizes the relay coil 125. The relay coil when energized effects movement of switch blades 126, 127 and 128 into engagement with contacts 129, 130, and 131. Contact 129 is connected to wire 132 and contact 130 is connected to wire 133, which wires are designated A and B and connect respectively with solenoid windings 119 and 118 of the solenoid valve 41. Contact 131 and switch blade 126 connect with an external circuit which does not pertain to this invention. When switch blades 127 and 128 are in an engagement with contacts 129 and 130, the energizing circuit for the solenoid valve 41 is completed.

The propeller drives an alternator, not shown, which develops an alternating current signal, the frequency of which is proportional to propeller speed. The output of the propeller driven alternator is connected to wires 134 and 135. These wires, 134 and 135 connect with a primary winding 136 of a transformer T1. The secondary winding 137 of the transformer T1, has its ends connected to plates 138 and 139 of a twin triode rectifier tube V1. The transformer secondary winding 137 is center-tapped at 140. The rectified voltage appearing across condenser C1 is proportional to propeller speed. This rectified voltage, or pulsating D.C., is then filtered by condenser C1 and inductance coils L1 and L2. The rectified and filtered direct current voltage proportional to propeller speed is then differentiated by differentiating circuit comprising capacitor C2 and resistor R4, and capacitor C4 and resistor R3. The voltage at the grids of the twin triode V2 is thus proportional to the rate of change of propeller speed. The twin triode tube V2 operates as an amplifier, and is balanced by potentiometer P1 so that zero output voltage is obtained for a zero acceleration or deceleration input signal. When the output of the amplifier V2 is zero, there is no bias on the grids of the amplifier tube V3, and hence both sides of tube V3 conduct. Consequently, power tubes V4, V5, V6, and V7 are cut off by the bias voltage output signals of both sides of tube V3, and consequently no input signals are fed to wires 141 and 142. Thus, the solenoid valve is deenergized and remains in a neutral position as shown in Figure 1.

However, during a change in propeller speed, the output voltage of the amplifier section V2 is proportional to the rate of change of propeller speed. Under these conditions, the grid of the upper section of tube V3 becomes more positive than the grid of the bottom section of tube V3. Accordingly, the bottom section of the tube V3 stops conducting, and the signal level at which the two sections of V3 stop conducting can be varied by adjusting potentiometer P2. When the bottom of tube section V3 stops conducting, the bias on tubes V6 and V7 is removed and the tubes will conduct so as to energize solenoid winding 119 thereby moving the solenoid plunger 113 to the left as viewed in Figure 1 so as to increase propeller pitch. The energization of the solenoid winding 119 is continuous, rather than being pulsating.

Conversely, during the propeller deceleration, the upper tube section of the tube V3 will be cut off while the lower section of tube V3 will be conducting. In this situation, the cut off bias on the grids of tubes V4 and V5 will be removed, and these tubes will conduct so as to energize solenoid winding 118 through wire 141, contact 129, and wire 132 thereby effecting movement of the solenoid plunger 113 to the right so as to decrease propeller pitch.

The power supply for the tubes V4, V5, V6 and V7 is obtained from a transformer T2. The transformer T2 includes a primary winding 143 which is energized from a suitable source of alternating current, not shown. The transformer T2 also includes a center-tapped secondary winding 144 as well as secondary windings 145, 146, and 147, which are used as filament supply for the tubes V1 through V7. The center tapped secondary winding 144 has its opposite ends connected to rectifier tubes V8 and V9. Tubes V8 and V9 constitute a full wave rectifier, and the output thereof is filtered by a network including a resistor R6 and capacitors C5 and C6. The output of the filtering network is fed by wire 148 to the plates of the tubes V4, V5, V6, and V7. The bottom side of secondary winding 144 is also connected to a twin triode rectifier tube V10, the output of which is filtered by network R7, R8, and condensers C7 and C8. The voltage from the filtering network is fed by wire 149 to a pair of voltage regulator tubes VR1 and VR2. The sensitivity potentiometer P2 has one side connected through resistor R9 to a wire connecting the tubes VR1 and VR2. Thus, the potential of voltage at the cathodes of the sections of tube V3 is regulated by tube VR1. Similarly voltage at the plates of the sections of V2 are regulated by two tubes VR1 and VR2.

The tubes V1 and V2 are resistance coupled as shown in Figure 2. Similarly the tubes V2 and V3 are resistance coupled. Likewise, the tube sections of tube V3 and tubes V4 nad V5, as well as tubes V6 and V7, are resistance coupled. The acceleration sensitive circuit shown in Figure 2 is connected with a calibrating circuit in the lower left hand portion of Figure 2. The calibrating circuit includes a plurality of gang switches 150, 152, 153, 154, 155, and 156. Each of the switches contacts terminals 1, 2, 3 or 4. Terminal 1 is a normal position at which time the circuit is in the condition for operation of the solenoid valve. Terminal 2 is a battery adjust position, terminal 3 is the increase calibration position, and terminal 4 is the decrease calibration position. When the gang switches engage terminal #2, the output of battery B1 is checked through the voltage adjustor potentiometer P3. A volt meter 157 should indicate a full scale reading at this time. Thereafter, the gang switches are moved to position number 3, namely the increase calibration position, and potentiometer P4 is adjusted to obtain the desired reading on the volt meter 157. Thereafter the gang switches are moved to position 4, namely a decrease calibration position, and the potentiometer P1 is adjusted until the reading on the volt meter is the same as that obtained during the increase calibration setting. The unit is then returned to position 3, namely the increase calibration setting and the potentiometer P4 may have to be adjusted so that the volt meter 157 shows the same reading as in the decrease calibration position.

Then, the gang switches, are moved to the normal position. With the unit so calibrated the acceleration sensitive circuit will provide the desired "on-off" acceleration control. Thus, the volt meter 157 will indicate when the solenoid valve is being energized. Referring again to Figure 1, the hydraulic control system also includes an electric motor driven pump which is employed to supply fluid under pressure to actuate the pitch changing motors when the propeller is not rotating.

The pump is indicated by a numeral 160 and is shown driven by an electric motor 161. The motor 161 may be connected to a suitable source of electric power through the propeller control lever 98 when it is moved to the feathered position. The pump 60 actually comprises two units having input conduits 162 and 163, the output of the pumps being connected to conduit 164 to port 165 of a feathering control valve 166. The feathering control valve includes a spring biased check valve 167, and a pressure control valve 168. The pressure control valve 168 comprises a plunger 169 having a land 170 which is exposed to the pressure in the conduit 25. The plunger 168 is biased downwardly, as viewed in Figure 1, by a spring 171. When the pressure in conduit 25 falls below the setting of spring 171, the plunger 169 will move downwardly to block the connection of port 165 with drain port 172. At this time the pressure developed by the pumps 160 will flow through check valve 167 and into the conduit 25. However, at all times when the pressure in conduit 25 exceeds the pressure equivalent of the spring 171, the plunger 169 will be maintained in the position shown in Figure 1 so that the pressure developed by the pumps 160 will be by-passed through ports 165 and 172 to drain, thereby unloading the pump.

Operation of the propeller control system is as follows: When the propeller lever is moved to the governing position, the output of the electronic acceleration sensiitve circuit is connected to the solenoid valve winding through the relay operated switch 127 and 128. At this time, when the propeller is operating on speed, that is, is neither accelerating or decelerating, and is operating at the speed setting of the centrifugally operable governor valve 42, the propeller pitch will remain substantially constant since the propeller is operating at the desired speed. However, should the propeller speed increase, the governor valve plunger 63 will move upwardly thereby supplying high pressure fluid to the increase pitch side of the pitch changing motors while connecting the decrease pitch side to drain. At the same time, the electronic acceleration sensitive circuit will sense an acceleration and energize winding 119 solenoid valve so as to assist the centrifugal governor valve in increasing the pitch to reduce the overspeed. However, as soon as the propeller begins to decelerate although it is still over speed, the winding 118 of the solenoid valve will be energized and the net flow to the torque units will be decreased since solenoid valve is connecting the opposite side of the torque unit to drain that is supplied with pressure from the centrifugal governor valve. However, as alluded to hereinbefore, since the centrifugal governor valve has a greater flow capacity than the solenoid valve, the net result will be that the propeller pitch will still be increased. However, by having the acceleration sensitive control, hunting of the propeller about the desired speed level will be reduced to the minimum.

When the propeller control lever is moved to the negative position, the acceleration sensitive circuit will be disconnected from the solenoid valve, which will then remain in a neutral position as shown in Figure 1. At this time, the switch blade 100 will engage contact 110, thereby energizing solenoid winding 109 and effecting movement of the plunger 103 to the left as viewed in Figure 1. This will result in the connection of chamber 88 to pressure and connection 87 to drain whereby the low pitch stop piston 82 will move to the right and into engagement with cylinder wall 83. Accordingly, the spring 73 will cause the lever 72 to follow the downward movement of the roller so that the propeller pitch will be moved in a decrease direction to the negative pitch stop position. When the propeller blades reach the negative pitch stop position the feed-back rod 119 will position the governor valve 63 through the link 77 and lever 72 so as to cut off further application of pressure fluid.

When the propeller control lever 98 is moved to the feathering position, the switch blade 100 will engage contact 101 thereby energizing solenoid winding 96. Accordingly, the plunger 92 will move to the left so as to connect chamber 85 to drain whereupon both pistons 81 and 82 will move to the left as viewed in Figure 1 so as to cam the plunger 63 upwardly and direct pressure fluid to the increase pitch chambers of the torque units while the decrease pitch chambers are connected to drain. When the blades reach the feathered position the feed-back rod 19 will automatically cut off further application of fluid pressure to the torque units. As alluded to hereinbefore to complete the feathering movement of the blades it will be necessary to energize the motor 161 to supply the required fluid pressure. This may be done automatically upon movement of control lever 98 to the feathered position.

From the foregoing, it is apparent that the present invention provides a simplified propeller control system incorporating speed as well as acceleration sensitivity. The propeller control system includes servo mechanism for establishing the limits of full reverse pitch, feathering position, and an intermediate hydraulic low pitch stop.

While the form of embodiment of the invention as herein disclosed constitutes a preferred form, it is to be understood that other forms might be adopted, as may come within the scope of the claims which follow.

What is claimed is as follows:

1. A propeller control system for a variable pitch propeller having the blades movable about their longitudinal axes to different pitch positions and fluid motor means for actuating said blades, including, a source of fluid under pressure, a governor valve connected with said source and with said pitch adjusting motor means and responsive to the speed of propeller rotation for controlling the flow of fluid between said source and said pitch adjusting motor means to maintain propeller speed substantially constant, an element operatively associated with said governor valve for positioning the same to interrupt the supply of fluid pressure to said pitch adjusting motor means, a fluid motor for positioning said element, and means operatively connected to said blades and actuated by movement thereof for positioning said element so as to interrupt the supply of fluid under pressure to said pitch adjusting motor means at a plurality of predetermined pitch angles namely, a maximum negative pitch angle, a maximum positive pitch angle and a minimum positive pitch angle during constant speed operation.

2. A control system for a variable pitch propeller having blades rotatable about their longitudinal axes to different pitch positions and fluid motor means operatively connected with said blades for adjusting the pitch position thereof, including in combination, pressure developing means energized instant to propeller rotation, a governor operated valve operatively connected between said pressure developing means and said pitch adjusting fluid motor means for controlling the flow of said fluid therebetween so as to maintain propeller speed substantially constant, a fluid motor operatively associated with said governor operated valve for controlling the position thereof independent of propeller speed, said fluid motor comprising the cylinder having a first reciprocal piston therein, a second reciprocal piston therein, and a rod connected to the first reciprocal piston and extending from the cylinder, and manually operable means associated with said fluid motor for connecting said cylinder with said pressure developing means to position said pistons so as to initiate movement of the blades to a negative pitch position or the feathered position.

3. The combination set forth in claim 2 wherein said manually operable means include a solenoid operated comprising the cylinder having a first reciprocal piston to call for moving of said propeller blades to the feathering position.

4. The combination set forth in claim 2 wherein said manually operable means includes a solenoid operated valve for controlling the position of the said first piston to call for movement of said propeller blades to the negative pitch position.

5. The combination set forth in claim 2 wherein said second piston slideably engages the rod of said first piston, said second piston being operable as a stop for limiting movement of the first piston in one direction.

UNITED STATES PATENTS

References Cited in the file of this patent

| | | |
|---|---|---|
| 2,358,894 | Volet | Sept. 26, 1944 |
| 2,663,373 | Richmond | Dec. 22, 1953 |
| 2,667,344 | Robbins | Jan. 26, 1954 |
| 2,669,312 | Dinsmore | Feb. 16, 1954 |
| 2,678,103 | Martin et al. | May 11, 1954 |
| 2,703,148 | Pearl | Mar. 1, 1955 |
| 2,737,253 | Moore et al. | Mar. 6, 1956 |
| 2,754,921 | Dinsmore | July 17, 1956 |